(12) United States Patent
Xu et al.

(10) Patent No.: US 11,450,324 B2
(45) Date of Patent: Sep. 20, 2022

(54) METHOD OF DEFENDING AGAINST INAUDIBLE ATTACKS ON VOICE ASSISTANT BASED ON MACHINE LEARNING

(71) Applicant: ZHEJIANG UNIVERSITY, Hangzhou (CN)

(72) Inventors: Wenyuan Xu, Hangzhou (CN); Xiaoyu Ji, Hangzhou (CN); Guoming Zhang, Hangzhou (CN); Chen Yan, Hangzhou (CN); Tianchen Zhang, Hangzhou (CN); Taimin Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 132 days.

(21) Appl. No.: 16/853,782

(22) Filed: Apr. 21, 2020

(65) Prior Publication Data

US 2020/0251117 A1 Aug. 6, 2020

Related U.S. Application Data

(63) Continuation of application No. PCT/CN2018/083371, filed on Apr. 17, 2018.

(51) Int. Cl.
*G10L 15/22* (2006.01)
*G10L 15/26* (2006.01)
(Continued)

(52) U.S. Cl.
CPC .............. *G10L 15/26* (2013.01); *G06N 20/00* (2019.01); *G10L 15/063* (2013.01); *G10L 15/22* (2013.01)

(58) Field of Classification Search
CPC ........................ G10L 15/22; G10L 2015/223
See application file for complete search history.

(56) References Cited

U.S. PATENT DOCUMENTS

2017/0200451 A1* 7/2017 Booklet ................. G10L 17/02
2018/0350356 A1* 12/2018 Garcia ................... G10L 15/22
(Continued)

FOREIGN PATENT DOCUMENTS

CN 106531159 A 3/2017
CN 107393525 A 11/2017
(Continued)

OTHER PUBLICATIONS

Carlini, Nicholas, et al. "Hidden voice commands." 25th {USENIX} Security Symposium ({USENIX} Security 16). 2016. (Year: 2016).*
(Continued)

*Primary Examiner* — Jialong He
(74) *Attorney, Agent, or Firm* — W&G Law Group

(57) ABSTRACT

The present disclosure discloses a machine learning-based method for defending a voice assistant from being controlled by an inaudible command, including following steps: 1) collecting data of positive and negative samples, 2) performing data segmentation on data of the positive and negative samples; 3) selecting and normalizing sample features; 4) selecting a classifier to be trained and generate a detection model for a malicious voice command; 5) detecting a voice command to be detected by the detection model. The present disclosure selects an original feature selection method, and for smart devices of different types, it is necessary to obtain normal voice commands and malicious voice commands by means of a smart device of this type, and use them as the positive and negative samples to train a specific classifier for the device. Such a customized approach can well solve a problem that detection and defense between devices cannot work.

5 Claims, 2 Drawing Sheets

(51) Int. Cl.
    *G06N 20/00*   (2019.01)
    *G10L 15/06*   (2013.01)

(56) References Cited

U.S. PATENT DOCUMENTS

| | | | | |
|---|---|---|---|---|
| 2018/0374487 | A1* | 12/2018 | Lesso | G10L 25/06 |
| 2019/0005964 | A1* | 1/2019 | Lesso | H04L 63/1466 |
| 2019/0043503 | A1* | 2/2019 | Bauer | G10L 15/22 |
| 2019/0115046 | A1* | 4/2019 | Lesso | G10L 25/93 |
| 2019/0122691 | A1* | 4/2019 | Roy | H04B 1/04 |

FOREIGN PATENT DOCUMENTS

| | | |
|---|---|---|
| CN | 107452371 A | 12/2017 |
| CN | 107452401 A | 12/2017 |

OTHER PUBLICATIONS

Abdrea Fortuna, "DolphinAttack: inaudible voice commands allows attackers to control Siri, Alexa and other digital assistants", Sep. 2017 (Year: 2017).*

Li, Lantian, et al. "A study on replay attack and anti-spoofing for automatic speaker verification." arXiv preprint arXiv: 1706.02101 (Jun. 2017). (Year: 2017).*

Song, Liwei, and Prateek Mittal. "Poster: Inaudible voice commands." Proceedings of the 2017 ACM SIGSAC Conference on Computerand Communications Security. Aug. 2017. (Year: 2017).*

"Dolphin Attack: Inaudible Voice Commands" Zhang, Guoming et al. CCS'17 Proceedings of the 2017 ACM SIGSAC Conference on Computer and Communications Security [Nov. 3, 2017].

International Search Report (PCT/CN2018/083371); dated Aug. 24, 2018.

* cited by examiner

METHOD OF DEFENDING AGAINST INAUDIBLE ATTACKS ON VOICE ASSISTANT BASED ON MACHINE LEARNING

TECHNICAL FIELD

The present disclosure relates to the field of artificial intelligence voice assistant security, and more particularly, relates to a method of defending against inaudible attacks on voice assistant based on machine learning.

BACKGROUND

As a convenient and effective human-computer interaction method, voice assistants such as Siri, Google Now, Alexa, Cortana, S Voice, Hi Voice have become more and more popular in people's lives, and almost all smartdevices (smartphones, tablets, rearables, and smart speaker) are equipped with corresponding voice assistants.

However, the voice assistant also faces a variety of security risks. For example, there is a method [Zhang, G., Yan, C., Ji, X., Zhang, T., Zhang, T., & Xu, W. (2017). DolphinAtack: Inaudible Voice commands. arXiv preprint arXiv:1708.09537.] named "Dolphin Attack" which can, by taking advantages of a vulnerability of a microphone circuit of the smart device, silently control the voice assistant so as to command the smart device to execute a corresponding command, such as silently turning on the voice assistant, dialing a pay phone or monitoring the phone, video calling, sending a pay message, turning on airplane mode, operating a navigation system of an Audi car, shopping, and even unlocking an Nexus 7 silently. Therefore, an attacker can manipulate a user's smart device without knowledge of the user, resulting in a series of security problems such as privacy leakage and property loss. A process for implementing the attack is as shown in FIG. 1. The attacker first modulates, in an amplitude modulation manner, an ordinary audible voice signal to an ultrasonic frequency band and then sends it out through an ultrasonic transmitter, and at this tune, a human ear cannot hear it. However, the microphone circuit of the smart device can hear it and can demodulate the amplitude modulated signal to recover the voice signal before modulation, and at this time, the voice assistant identifies the voice signal and controls the smart device to perform malicious operations.

Although functions of the various smart devices equipped with the voice assistants are slightly different, the malicious operations that can be performed by the attacker are:

1. Visiting a malicious website. The device can open a malicious website, which can launch a drive-by-download attack or exploit a device with 0-day vulnerabilities.
2. Spying. An adversary can make the victim device initiate outgoing video/phone calls, therefore getting access to the image/sound of device surroundings
3. Injecting fake information. An adversary may instruct the victim device to send fake text messages and emails, to publish fake online posts, to add fake events to a calendar, etc.
4. Denial of service. An adversary may inject commands to turn on the airplane mode, disconnecting all wireless communications.
5. Concealing attacks. The screen display and voice feedback may expose the attacks. The adversary may decrease the odds by dimming the screen and lowering the volume.

The "Dolphin Attack" is a new type of attack initiated by exploiting hardware vulnerabilities of the smart devices, and currently there is no specific feasible defense solution. The related art [Zhang, G., Yan, C., Ji, X., Zhang, T., Zhang, T., & Nu, W. (2017). DolphinAtack: Inaudible Voice commands. arXiv preprint arXiv:1708.09537.] proposes two defense methods: a hardware-based defense method and a software-based defense method.

The hardware-based method recommends a manufacturer to redesign the microphone circuit so that high-frequency sounds cannot be received by the microphone or the hardware circuit filters out the high-frequency sounds after identifying them.

The software-based defense method utilizes a difference between audible and inaudible sounds to distinguish, through machine learning, between a normal command and an inaudible command. This method successfully distinguishes commands "Hey" of the normal sound and the inaudible sound by using a Support Vector Machine (SVM). A specific operation is as follows.

Step 1: recording, by a mobile phone, 5 audible voice commands 'Hey' as a positive sample, and then recording an inaudible voice command "Hey" as a negative sample.

Step 2: training an SVM classifier with the positive and negative samples.

Step 3: identifying the audible and inaudible voice commands using the trained classifier.

3) analyzing shortcomings existing in the related art mentioned in 2), i.e., technical problems to be solved by the present disclosure.

The shortcomings of the hardware-based and software-based defense method proposed by the related art lie in that:

1. the manufacturer cannot make hardware improvements to the smart devices that have been sold or a recall cost is unacceptable to the manufacturer.
2. it has always been a problem that microphone circuits can receive ultrasound, and this problem has not been effectively solved although the technology and process have been advanced and developed. Therefore, the hardware-based defense method is a defense method that is of a high-cost, difficult, and takes a long term, which cannot effectively solve the existing problems.
3. The software-based solution in the related art tests only one voice commands "Hey" on one smart device, so it is impossible to determine whether the method can be used in different smart devices, different voice commands, and different vocal defense effects.

SUMMARY

In order to defend against the "Dolphin Attack", the present disclosure proposes a machine learning-based method to defend against the "Dolphin Attack". This method can effectively identify whether a received voice command is a malicious or normal command and then cancel identification and execution of the malicious command, thereby completely eradicating a possibility of the "Dolphin Attack" from a software level.

The technical solution of the present disclosure is specifically as follows.

First, a training phase of a classifier is performed.

Step 1, collecting sample data. Normal voice data and malicious voice data are used as positive and negative samples.

Step 2: preprocessing voice signals, classifying the collected voice data (dividing into two classifications: the normal voice data and the malicious voice data) and segmenting the voice data. The segmentation of the voice data includes finding a beginning and an end of each voice signal and segmenting the data.

Step 3: calculating sample features, normalizing and labelling. To calculate the sample features from the segmented sample data, 11 features of minimum value, average value, energy, skewness, kurtosis, spectrum mean, spectrum variance, spectrum standard deviation, irregularity, square root amplitude, and spectrum centroid of all data points for each sample need to be calculated. An input of this part is the sample data, and an output is a time-frequency domain feature file of each sample data.

In order to make a classification accuracy of the classification algorithm more accurate, normalization of the sample features is needed. These sample features need to be normalized, and the maximum value of each sample feature is set to 1. An input of this part is the time domain frequency domain feature of each sample, and an output is the normalized time domain frequency domain feature.

Finally, the normalized time-frequency domain features are labeled. The feature of the normal voice command is 1 and the feature of the malicious voice command is 0.

Step 4: training the support vector machine (SVM) classifier. The classification algorithm of the SVM is a core of the detection. One SVM classifier needs to be trained based on the positive and negative sample data before the SVM is used.

The above four steps belong to the training phase of the SVM classifier. The following is the use of the SVM classifier to detect the malicious voice commands. Before the voice assistant receives the voice command to be identified, it needs to be detected by the SVM classifier. The voice identification is performed only when the detection result is a normal command, otherwise an alarm is issued or the voice command is discarded.

Step 5: preprocessing the voice signal received and demodulated by the microphone circuit, referring to the Step 2.

Step 6: calculating the features, normalizing, referring to the Step 3, but not including the labeling operation.

Step 7: inputting the normalized sample data to the SVM classifier for identification.

The various features are defined as follows:

$$\text{average value: } \bar{x} = \frac{1}{N}\sum_{n=1}^{N} x_n$$

$$\text{energy: } E = \sum_{n=1}^{N} x_n^2$$

$$\text{skewness: } \frac{1}{N}\sum_{n=1}^{N} \left[\frac{x_n - \bar{x}}{\sigma}\right]^3$$

$$\text{kurtosis: } \frac{1}{N}\sum_{n=1}^{N} \left[\frac{x_n - \bar{x}}{\sigma}\right]^4$$

$$\text{spectrum mean: } \frac{1}{\sum_{n=1}^{N} a_n} * \sum_{n=1}^{N} f_n a_n$$

$$\text{spectrum variance: } \frac{1}{\sum_{n=1}^{N} a_n} * \sum_{n=1}^{N} (f_n - \bar{s})^2 * a_n$$

$$\text{spectrum standard deviation: } \sqrt{V_s}$$

$$\text{irregularity } \frac{\sum_{n=1}^{N} (a_n - a_{n+1})}{\sum_{n=1}^{N} a_n^2}$$

$$\text{square root amplitude: } \sqrt{\frac{1}{N}\sum_{n=0}^{N-1} a_n^2}$$

-continued $$\text{spectrum centroid: } \frac{\sum_{n=1}^{N} y(n)z(n)}{\sum_{n=1}^{N} z(n)}$$

where N is the number of sample data points, $x_n$ is a power consumption value of the $n^{th}$ point, $\sigma$ is the standard deviation, $a_n$ is a magnitude of the energy at the $n^{-th}$ frequency $f_n$ after a frequency domain transformation, $\bar{s}$ is the spectrum mean, $V_s$ is the spectrum variance, $z(n)$ is a weighted frequency value, and $y(n)$ represents a center frequency of the sample point; the minimum value is the minimum power consumption value of all points.

Using the SVM classification algorithm, whether the current sample is a positive sample is determined according to the time domain frequency domain features. An input of this part is the normalized time domain frequency domain feature, and an output is the SVM classification prediction result, i.e., whether the current voice is a malicious voice command.

Since then, the detection of the malicious voice commands and the defense of the voice assistants have been achieved.

(1) After analyzing the normal voice signal and the malicious voice signal, it is found that the malicious voice signal is suppressed in the high frequency band. That is, the malicious voice command recovered from the inaudible voice command has a relatively small intensity in the higher frequency band. Different mobile phones, different voice commands, different speakers behave the same in this aspect, and this is a common phenomenon. Therefore, differentiation and detection can be performed by means of the machine learning.

(2) For any machine learning method, the final identification accuracy and reliability largely depend on a selection of the feature vector and a selection of the classifier. The selection of the feature vector determines an upper limit of the classification ability of the classifier, and the training method of the classifier largely determines a rate at which the classification is performed. Considering the importance of the voice signal feature selection, the feature vector that can reflect a difference between the normal voice command and the malicious voice command is selected by first analyzing the characteristics of the voice command, based on which, a suitable machine learning algorithm is selected.

(3) After testing, it is found that nonlinear effects of the microphone circuits of the different smart devices are very different. Thus, for the same inaudible voice signal, the malicious voice signals obtained through demodulation by the different smart devices are different. Thus, it is impossible or inefficient to build a unified detection model, and there is no need to create a unified model.

For different types of smart devices, it is necessary to obtain the normal voice command and the malicious voice command through this type of smart device and use them as the positive and negative samples to train a specific classifier directed at this type of device. Through this customized manner, the problem that the detection cannot be performed across devices can be well solved.

Figure 1:
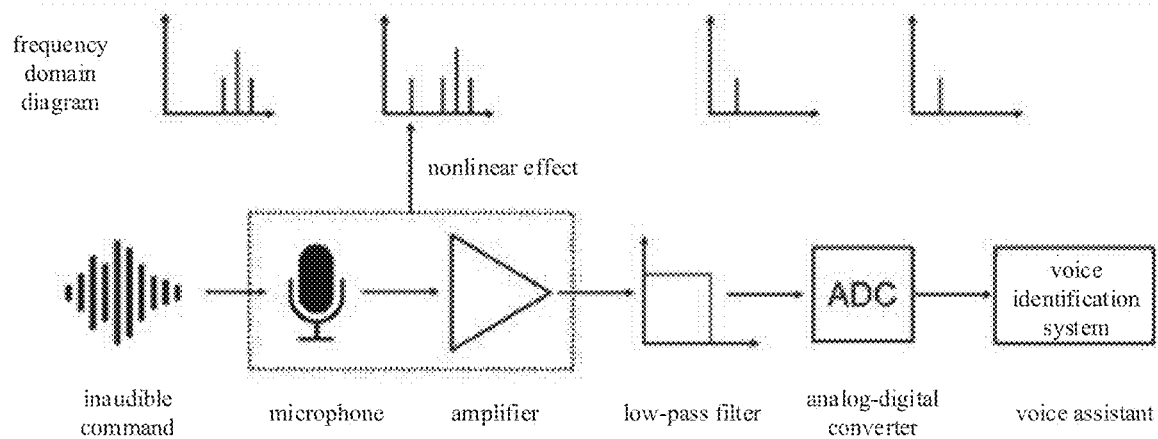
FIG. 1 is a schematic diagram illustrating a voice assistant capable of receiving a malicious voice signal.

An upper half of FIG. 1 schematically illustrates a spectrum of a signal, and a lower half schematically illustrates a microphone circuit of an smart device.

An attacker can modulate an audible low frequency signal to an ultrasonic frequency band and send it out, and at this time, a human ear can't hear it. There is only a high frequency signal in a spectrogram. After receiving the signal, the microphone circuit on the smart device will demodulate to obtain the low frequency signal that is audible before modulation. At this time, it can be seen from the spectrogram that a low frequency signal is generated, and this phenomenon is caused by a nonlinear effect of the microphone circuit. Just due to this vulnerability of the hardware, a voice assistant is capable of identifying an "inaudible voice command."

Figure 2:
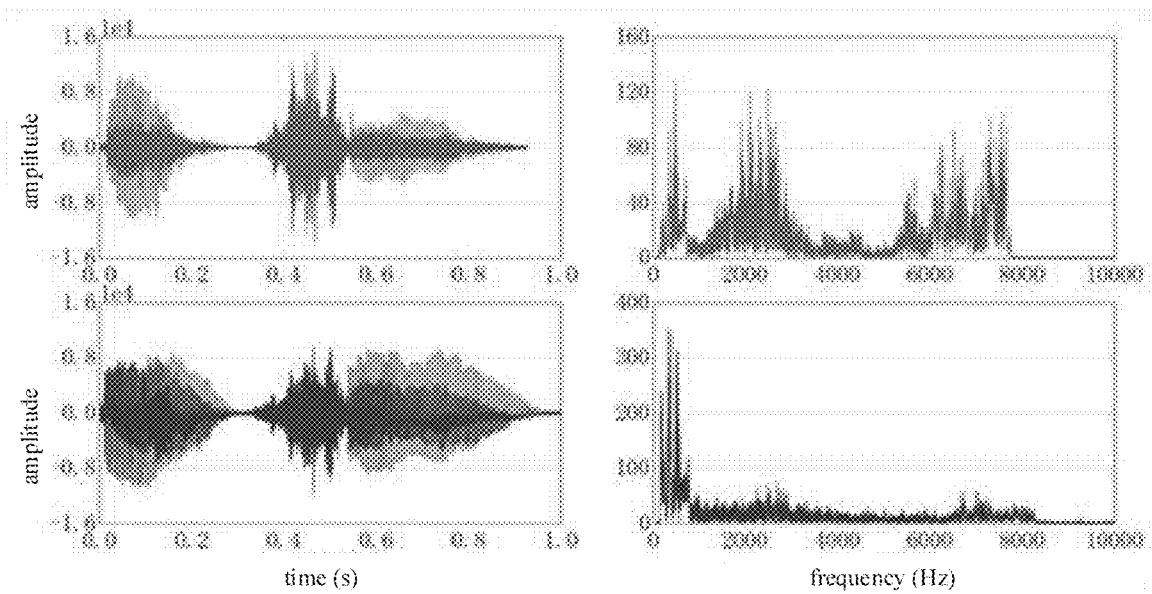

FIG. 2 illustrates a comparison of a normal voice signal and a malicious voice signal in a time-frequency domain.

This voice command is "HeySiri" An upper part is a normal audible voice signal, and a lower part is a voice signal obtained through demodulation by the microphone circuit. As seen from the frequency domain diagram in a right half, an intensity of the demodulated signal in a high frequency band is much lower than that of the normal voice signal in the high frequency band.

Figure 3:
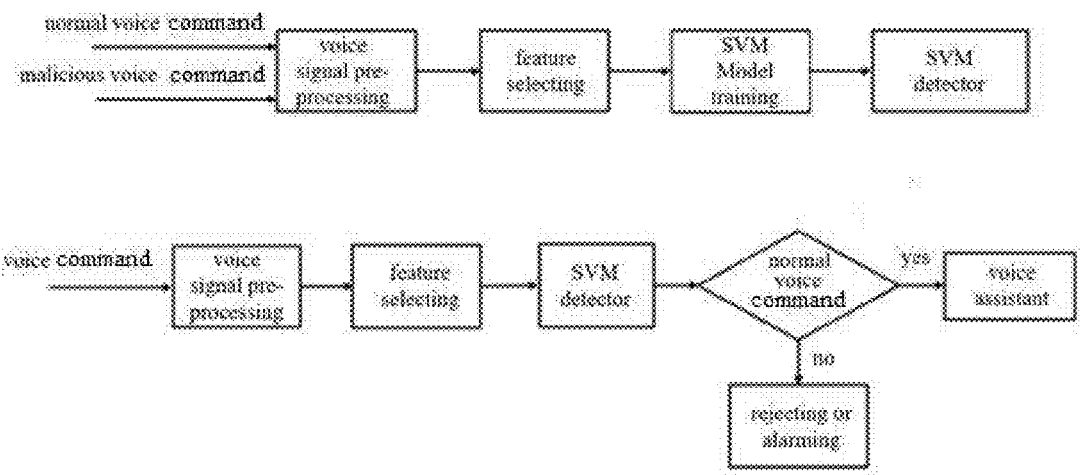

FIG. 3 is a diagram illustrating a process of training of a detector SVM and detection of a malicious voice command.

Figure 4:

FIG. 4 is a flow chart of an improved voice control, in which an SVM classifier is used as a new module to detect a malicious voice signal.

DESCRIPTION OF EMBODIMENTS

The preferred embodiments of the present disclosure are described in details as follows.

FIG. 2 illustrates a comparison of a normal voice signal and a malicious voice signal in a time-frequency domain. It can be seen from FIG. 2 that an ordinary voice signal recorded by a mobile phone and a malicious signal (a signal obtained by demodulation) are obviously different in a high frequency band. Therefore, the malicious voice command can be identified by a machine learning algorithm. As shown in FIG. 3 and FIG. 4, aiming at a "Dolphin Attack", the present disclosure performs a targeted defense, and it can detect a inaudible voice command of the "Dolphin Attack", thereby fundamentally eliminating a possibility of the voice assistant and the smart device being controlled by the inaudible voice command.

A following embodiment is a method of defending against inaudible attacks on voice assistant based on machine learning. The defense device under test is an iPhone SE. The defense of other different types of smart devices is consistent with this method and will not be further described.

A training phase of a classifier:

Data collection of positive and negative samples.

In order to enable the trained classifier to detect inaudible attacks of different vocals and voice commands, the collection of the positive and negative samples should take into account different vocals and different voice commands.

Therefore, a TIMIT voice database is selected. The database contains voices of 630 speakers. Languages that they speak include eight major dialects of the American English, and each person reads 10 voice-rich sentences.

Generation of the positive sample: selecting 10 people's voices (including 100 sentences in total) from the TIMIT voice database as the positive sample.

Generation of the negative sample: using a signal generator (Keysight Technologies. 2017. N5172B EXG X-Series RF Vector Signal Generator, 9 kHz to 6 GHz. to modulate the voices of the positive sample to an ultrasound band, playing it out through an ultrasonic speaker [Avisoft Bioacoustics. 2017. Ultrasonic Dynamic Speaker Vifa.] (a modulation manner: amplitude modulation, a modulation depth: 100%, a carrier frequency: 20-45 kHz), and further using the iPhone SE mobile phone to record the malicious voice signals, which are obtained by demodulating the sounds inaudible to the human ear, as the negative sample (including 10 speakers, 100 sentences in total).

1. Data Preprocessing.

After collecting the above data, classifying of the positive and negative samples is performed first. Then segmentation of the voice data is performed.

A following voice data segmentation algorithm is used.

In order to detect when each command begins and ends, a threshold is used to detect, and the obtained sound data is segmented by a length of 20 ms. if signal intensities $E=\Sigma_{i=0}^{n} x_1^2$ ($x_i$ is a value of an $i^{th}$ data point) of four consecutive segments are larger than a threshold, then it can be determined that a beginning position of a first segment is a beginning position of an entire sentence. Similarly, if the signal intensities of the four consecutive segments are smaller than a threshold, then it can be determined that the beginning position of the first segment is an end position of the entire sentence. The voice command can be segmented according to the beginning position and the end position.

2. Sample Feature Selection, Calculation and Normalization.

Taking into account the characteristics of the voice signal, the features that can be thought of at first are indexes such as an average value and a minimum value. However, these indexes cannot fully reflect a difference between the normal voice signal and the malicious voice signal. Therefore, it is necessary to perform statistical analysis to select more features that can effectively reflect the difference between the normal and abnormal voice signals. After a series of optimizations, feature is selected from the voice data, and then 11 indexes, which can most reflect the difference between the normal and malicious voices, are selected from a large number of time-frequency features obtained by calculation. These features are used to replace the collected voice data and are used as input information of a subsequent machine learning process. The feature vectors include: minimum value, average value, energy, skewness, kurtosis, spectrum mean, spectrum variance, spectrum standard deviation, irregularity, square root amplitude, and spectrum centroid.

In order to make a classification accuracy of the classification algorithm more accurate, a normalization processing of the sample features is needed. A maximum value of each sample feature is set to 1. An input of this part is a time domain frequency domain feature of each sample, and an output is a normalized time domain frequency domain feature.

Finally, the normalized time-frequency domain features are labeled. A label of the normal voice command feature is 1 and a label of the malicious voice feature is 0.

3. After determining feature information that needs to be selected, selection of machine learning algorithm is performed. The normal voice and malicious voice data are used as training samples for the machine learning, whereas the SVM machine learning algorithm for finite sample learning problems can be applied to this application scene.

Selecting the SVM machine learning algorithms has following three advantages.

(1) Because the SVM algorithm has very fast training speed and deciding speed, the malicious voice command can be quickly identified.

(2) Due to the characteristics of the SVM algorithm itself, the algorithm is insensitive to dimensionality of the input data. This advantage allows to find new features that reflect information differences in future work, so that a system can be improved without affecting the efficiency of the system.

(3) Using the SVM algorithm can also enable the system to have self-learning capabilities. As data used for training increases, values of various parameters can be continually corrected during the training process of the classifier, based on which a relatively complete detection system is constructed.

After selecting the SVM classifier, the classifier is trained and a detection model is generated for detecting the malicious voice command.

The process for detecting the malicious voice command:

the trained SVM detection model can be embedded to the voice assistant in the system. Here, the test is performed on a computer. First, preprocessing and feature selection are performed on the recorded normal, malicious voice commands. Then the trained SVM classifier is used to detect.

In order to verify feasibility of the method, capability of the method for distinguishing between the normal voice command and the malicious voice command is tested by experiments.

Generation of the normal voices to be tested: voices of 10 people are selected from the TIMIT voice database as the normal voices to be tested.

Generation of the malicious voices to be tested: using a signal generator (Keysight Technologies. 2017. N5172B EXG X-Series RF Vector Signal Generator, 9 kHz to 6 GHz. to modulate the voices of the positive sample to the ultrasound band, playing it out through an ultrasonic speaker [Avisoft Bioacoustics. 2017. Ultrasonic Dynamic Speaker Vifa.] (a modulation manner: amplitude modulation, modulation depth: 100%, a carrier frequency: 25 kHz), and using the iPhone SE mobile phone to record these malicious voice signals, which are obtained by demodulating these sounds inaudible to the human ear, as the malicious voice to be tested.

10 people, 100 normal voices and 100 malicious voices are tested. The final experimental result shows that regardless of the speaker and the voice command, the classifier can distinguish the normal voice command with an accuracy of 98% and distinguish the malicious voice command with an accuracy of 94%.

It can be determined through the final test result that the method is effective for the "Dolphin Attack" for different speakers and different commands. Therefore, manufacturers of the smart devices only need to upgrade the system or software to quickly and effectively solve the security problems existing in various smart devices.

What is claimed is:

1. A method of defending against inaudible attacks on voice assistant based on machine learning, comprising steps of:
   1) collecting data of positive and negative samples,
   2) performing data segmentation on the collected data of the positive and negative samples;
   3) calculating and normalizing features of the segmented data;
   wherein the features comprise: a minimum value, an average value, energy, skewness, kurtosis, spectrum mean, spectrum variance, spectrum standard deviation, irregularity, square root amplitude, spectrum centroid, the features constitute feature vectors, and the feature vectors replace the collected data as input information in a subsequent process;
   normalization processing is performed on the feature vectors, a maximum value of each sample feature is set to 1;
   finally, the normalized feature vectors are labeled, wherein a label of a normal voice command feature is 1 and a label of a malicious voice feature is 0;
   4) using the normalized and labeled feature vectors as a model input, performing training and generating a detection model for detecting a malicious voice command; and
   5) detecting, by the detection model trained in the step 4), a voice command to be detected.

2. The method of defending against inaudible attacks on voice assistant based on machine learning according to claim 1, wherein the respective features are defined as follows:

the average value: $\bar{x} = \frac{1}{N}\sum_{n=1}^{N} x_n$;

the energy: $E = \sum_{n=1}^{N} x_n^2$;

the skewness: $\frac{1}{N}\sum_{n=1}^{N} \left[\frac{x_n - \bar{x}}{\sigma}\right]^3$;

the kurtosis: $\frac{1}{N}\sum_{n=1}^{N} \left[\frac{x_n - \bar{x}}{\sigma}\right]^4$;

the spectrum mean: $\frac{1}{\sum_{n=1}^{N} a_n} * \sum_{n=1}^{N} f_n a_n$;

the spectrum variance: $\frac{1}{\sum_{n=1}^{N} a_n} * \sum_{n=1}^{N} (f_n - \bar{s})^2 * a_n$;

the spectrum standard deviation: $\sqrt{V_s}$;

the irregularity: $\frac{\sum_{n=1}^{N}(a_n - a_{n+1})}{\sum_{n=1}^{N} a_n^2}$;

the square root amplitude: $\sqrt{\frac{1}{N}\sum_{n=0}^{N-1} a_n^2}$; and the spectrum centroid: $\frac{\sum_{n=1}^{N} y(n)z(n)}{\sum_{n=1}^{N} z(n)}$, where N is a number of sample data points, $x_n$ is a power consumption value of an $n^{th}$ point, $\sigma$ is the standard deviation, $\alpha_n$ is a magnitude of the energy at an $n^{th}$ frequency $f_n$ after frequency domain transformation, $\bar{s}$ is the spectrum mean, $V_s$ is the spectrum variance, $z(n)$ is a weighted frequency value, and $y(n)$ represents a center frequency of a sample point.

3. The method of defending against inaudible attacks on voice assistant based on machine learning according to claim 1, wherein the performing training and generating a detection model for detecting a malicious voice command in step 4) comprises: selecting a machine learning algorithm to perform training and generating a detection model for detecting a malicious voice command.

4. The method of defending against inaudible attacks on voice assistant based on machine learning according to claim 1, wherein generation of a negative sample of the collected data in the step 1) comprises: modulating, by a signal generator, a voice of a positive sample to an ultrasound band, playing it out through an ultrasonic speaker, in which a modulation manner is an amplitude modulation, a modulation depth is 100% and a carrier frequency is within a range of 20-45 kHz; and then, recording malicious voice signals, which are obtained by demodulating, as the data of the negative sample.

5. The method of defending against inaudible attacks on voice assistant based on machine learning according to claim 1, wherein the data segmentation comprises: segmenting obtained data by a length of 20 ms; and then determining that a beginning position of a first segment is a beginning position of an entire sentence if signal intensities energy of four consecutive segments are larger than a threshold, and determining that the beginning position of the first segment is an end position of the entire sentence if the signal energy of the four consecutive segments are smaller than the threshold; and then segmenting the voice command based on the beginning position and the end position.

* * * * *